US012579655B1

(12) United States Patent
Roth et al.

(10) Patent No.: US 12,579,655 B1
(45) Date of Patent: Mar. 17, 2026

(54) THREE-DIMENSIONAL IMAGE SEGMENTATION USING NEURAL NETWORKS

(71) Applicant: Nvidia Corporation, Santa Clara, CA (US)

(72) Inventors: Holger Roth, Rockville, MD (US); Jingsheng Cai, Gainesville, FL (US); Daguang Xu, Potomac, MD (US); Dong Yang, North Bethesda, MD (US)

(73) Assignee: NVIDIA Corporation, Santa Clara, CA (US)

( * ) Notice: Subject to any disclaimer, the term of this patent is extended or adjusted under 35 U.S.C. 154(b) by 51 days.

(21) Appl. No.: 16/383,343

(22) Filed: Apr. 12, 2019

Related U.S. Application Data

(60) Provisional application No. 62/726,680, filed on Sep. 4, 2018.

(51) Int. Cl.
| | |
|---|---|
| *G06T 7/143* | (2017.01) |
| *G06F 18/24* | (2023.01) |
| *G06N 3/045* | (2023.01) |
| *G06N 5/04* | (2023.01) |
| *G06T 7/60* | (2017.01) |

(52) U.S. Cl.
CPC .............. *G06T 7/143* (2017.01); *G06F 18/24* (2023.01); *G06N 3/045* (2023.01); *G06N 5/04* (2013.01); *G06T 7/60* (2013.01)

(58) Field of Classification Search
CPC ......... G06T 7/143; G06T 7/60; G09K 9/6267; G06N 3/0454; G06N 5/04
See application file for complete search history.

(56) References Cited

U.S. PATENT DOCUMENTS

| | | | |
|---|---|---|---|
| 2009/0136103 A1* | 5/2009 | Sonka ................. | G06K 9/6224 382/128 |
| 2018/0232887 A1* | 8/2018 | Lin ........................... | G06T 7/12 |

OTHER PUBLICATIONS

Berger, M., Tagliasacchi, A., Seversky, L., Alliez, P., Levine, J., Sharf, A. and Silva, C., Apr. 2014. State of the art in surface reconstruction from point clouds.*

(Continued)

*Primary Examiner* — Zhitong Chen
(74) *Attorney, Agent, or Firm* — Davis Wright Tremaine LLP

(57) ABSTRACT

Automatic volumetric quantification can be performed for various parameters of an object by providing volumetric data, such as three-dimensional image data, to at least one neural network. A network can extract features from the data that can be used to infer a point cloud representative of the surface of the object. One or more loss functions can be used to adjust the relevant network parameters. The network can also attempt to infer a segmentation mask for the object, indicating which data values correspond to the object of interest. Since the network performs the segmentation and point cloud generation in parallel, updates to the network parameters can impact the segmentation process, effectively constraining the segmentation based on the inferred shape of the object. Ensuring that the segmentation mask corresponds closely to the surface of the object can cause the segmentation process to be more accurate than conventional segmentation processes alone.

3 Claims, 10 Drawing Sheets

(56) References Cited

OTHER PUBLICATIONS

Qi, C.R., Su, H., Mo, K. and Guibas, L.J., 2017. Pointnet: Deep learning on point sets for 3d classification and segmentation. In Proceedings of the IEEE conference on computer vision and pattern recognition (pp. 652-660).*

Maninis, K.K., Caelles, S., Pont-Tuset, J. and Van Gool, L., 2018. Deep extreme cut: From extreme points to object segmentation. In Proceedings of the IEEE Conference on Computer Vision and Pattern Recognition (pp. 616-625).*

Grilli, E., Menna, F. and Remondino, F., 2017. A review of point clouds segmentation and classification algorithms. The International Archives of the Photogrammetry, Remote Sensing and Spatial Information Sciences, 42, pp. 339-344.*

Özgün Çiçek, Ahmed Abdulkadir, Soeren S. Lienkamp, Thomas Brox, Olaf Ronneberger; 3D U-Net: Learning Dense Volumetric Segmentation from Sparse Annotation; arXiv:1606.06650v1; Jun. 21, 2016.

Haoqiang Fan, Hao Su, Leonidas Guibas; A Point Set Generation Network for 3D Object Reconstruction from a Single Image; arXiv:1612.00603v2; Dec. 7, 2016.

Maninis et al., "Deep Extreme Cut: From Extreme Points to Object Segmentation," Conference on Computer Vision and Pattern Recognition, Jun. 2018, 10 pages.

Papadopoulos et al., "Extreme Clicking for Efficient Object Annotation," Proceedings of the IEEE International Conference on Computer Vision, 2017, 10 pages.

Yu et al., "Pu-net: Point Cloud Upsampling Network," CVPR, 2018, 10 pages.

\* cited by examiner

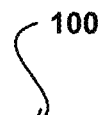
102
104
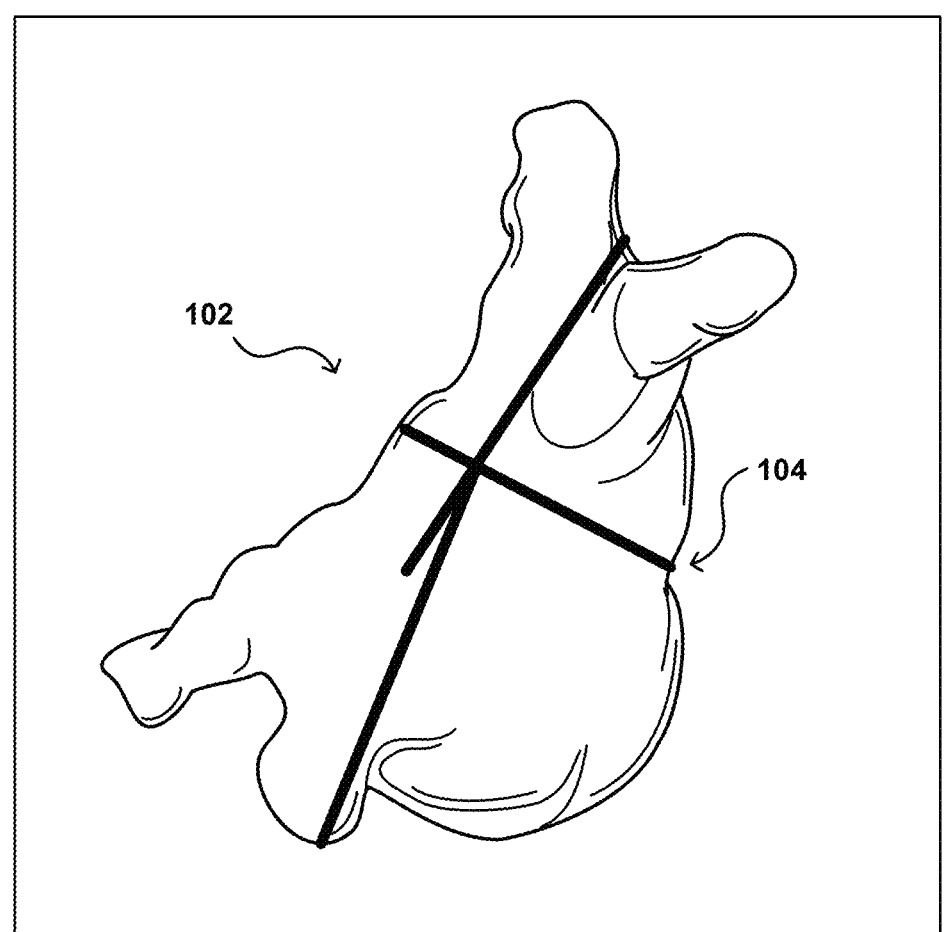
FIG. 1

600

602 — *Receive image data including a representation of at least one object of interest*

604 — *Extract a set of image features from the image data*

606 — *Perform segmentation to classify voxels as object / background*

*Compare inferred to ground truth segmentation*

608

610 — *Generate a point cloud representative of the surface of an object*

*Compare inferred to ground truth point clouds*

612

*Update network parameters*

614

616 — *Converge?*     No

Yes

618 — *Provide segmentation mask*

620 — *Determine object measurements using voxels classified as object per the mask*

FIG. 6

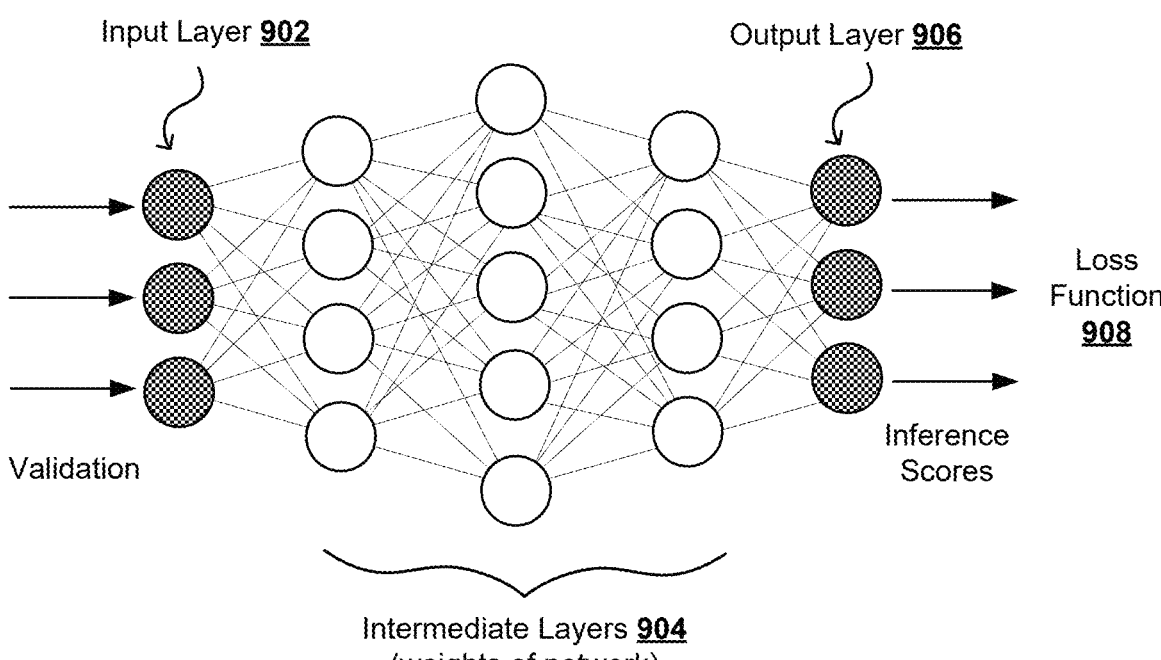
FIG. 9

1000

1002

THREE-DIMENSIONAL IMAGE SEGMENTATION USING NEURAL NETWORKS

CROSS-REFERENCE TO RELATED APPLICATIONS

This application claims priority to U.S. Provisional Patent Application Ser. No. 62/726,680, filed Sep. 4, 2018, entitled "Surface Constrained Learning: Improving 3D Organ Segmentation in Medical Imaging with Deep Learning Constraints from Surface Points," which is hereby incorporated herein by reference in its entirety and for all purposes.

BACKGROUND

Image analysis is becoming increasingly important in industries such as the medical industry. Devices such as computed tomography (CT) and magnetic resonance imaging (MRI) systems can generate images including three-dimensional information that can be used to model and make measurements of objects, such as human organs. In order to make the necessary measurements, however, it is often necessary to determine the portion (e.g., the subset of pixels or voxels) of the image that corresponds to the object of interest. Conventional segmentation approaches can attempt to determine the relevant portion, but results are not always accurate which can lead to misdiagnosis or other such issues.

BRIEF DESCRIPTION OF THE DRAWINGS

Various embodiments in accordance with the present disclosure will be described with reference to the drawings, in which:

FIG. 1 illustrates an example image of an organ that can be analyzed in accordance with various embodiments.

FIG. 6 illustrates a second example process for performing segmentation that can be utilized in accordance with various embodiments.

FIG. 9 illustrates layers of an example statistical model that can be utilized in accordance with various embodiments.

DETAILED DESCRIPTION

Figure 2:
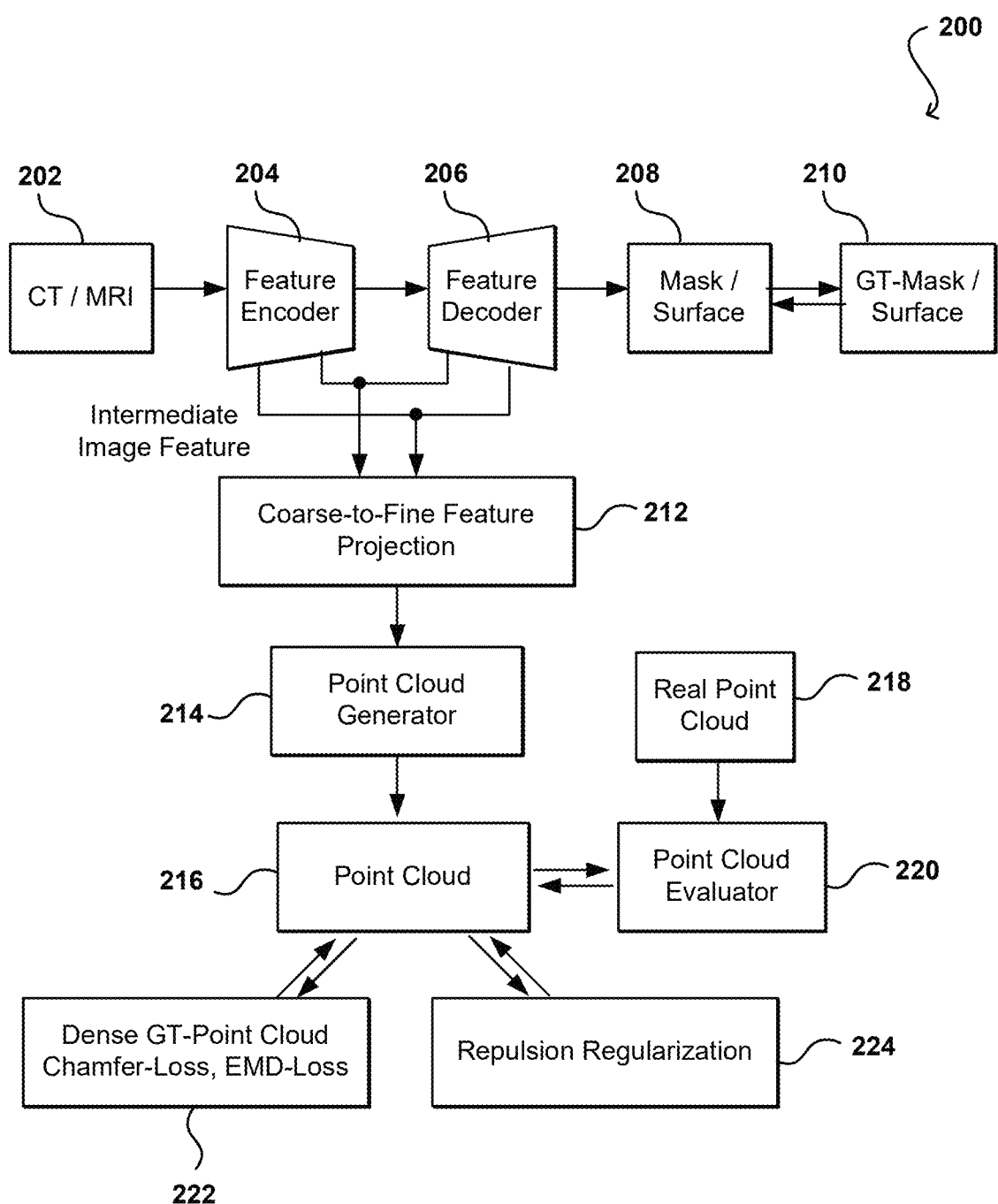
FIG. 2 illustrates an example dual branch architecture that can be utilized in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

It can be desirable for various applications to perform automatic volumetric quantification of one or more parameters of various three-dimensional objects. This can include, for example, quantifying human organ sizes using medical imaging for clinical workflows. For example, FIG. 1 illustrates an example view of a heart of a patient being examined. Automatic surface rendering and volumetric measuring of organs in medical images is often a pre-request in clinical practice. Conventional approaches can perform organ surface rendering and/or segmentation in computed tomography (CT) and magnetic resonance imaging (MRI) scans. A two-dimensional rendering 102 of a three-dimensional image (as may comprise a set of voxels having position values in three dimensions) can be rendered for display, such as is illustrated in FIG. 1. The three-dimensional image can be used to make various measurements 104 of the organ, such as for a qualitative analysis of the left atrium of the heart being analyzed, or volume size of a liver, among other such aspects. It can be desirable to be able to accurately make such measurements, as increased size can be evidence of swelling of the atrium, for example, which can indicate potential heart problems for the patient, among other such issues. In order for the measurements to be accurate, an accurate representation of the heart (or at least the relevant atrium) has to be generated from the received image data. An image such as may be generated from a CT scan or MRI can have multiple objects visible in the image, or can at least correspond to a volume in which other objects (e.g., organs) are present. Part of the process then can involve determining which voxels of image data correspond to the heart, and which do not. This can be achieved via region segmentation, for example, in which each voxel is classified as either corresponding to an object or to a background (or at least not corresponding to the object). The classification can be performed using deep learning models such as convolutional neural networks (CNNs). It can be challenging, however, to train a CNN model that has prior awareness of organ shapes for conventional CNN-based segmentation methods.

Accordingly, approaches in accordance with various embodiments present deep learning architectures that can provide for such training. These architectures can include, for example, a dual-branch deep learning architecture that can concurrently produce the segmentation mask and key points, such as may be located on the organ surface. Various embodiments can utilize approaches such as a coarse-to-fine feature projection, residual position learning, and/or local smooth regularization for the surface point cloud generation branch. Such architecture can include a segmentation branch and a point cloud branch that share common network layers for image feature encoding and decoding.

Such a network can be end-to-end trainable. The point cloud branch can constrain organ shape learning while also focusing on processing image features from the organ surface. Such a network can also update model parameters from network layers shared between the two branches, which can then benefit the segmentation branch to produce better segmentation masks, which are more consistent with the organ shape. Examples presented herein demonstrate various advantages such approaches for liver and left atrium segmentation in computed tomography scans. While embodiments are described with reference to organ segmentation and medical imaging generally, advantages of various embodiments can be obtained for other types of imaging applications as well, as may be utilized or useful in a wide variety of industries and technologies, including, without limitation: computer vision; visual interpretation; and image analysis on data acquired by distributed imaging devices such as: forensic science analysis; sub-surface detection and imaging (e.g., oil exploration, archaeology, paleontology); topography; oceanography; geology; osteology; meteorology; intelligent area or object tracking and monitoring; and sensor data (e.g., radar, sonar, or LIDAR) processing.

Approaches in accordance with various embodiments can model organ shape via one or more point clouds generated by a deep network in order to constrain the shape modeling abilities of the deep model. Such approaches can have the ability to learn from the structure of the organ surface, while conventional approaches are limited to the local pixel/voxel-space of the images. A dual-branch deep learning architecture can be utilized to combine organ segmentation and shape learning. A novel point cloud generator can be used to convert medical images into organ surface points. Adversarial learning can be used to encourage the model to produce realistic point clouds.

Precise shape representation can thus play an important role in automatic shape analysis. Various conventional shape analysis methods use shape representations that are built on top of object segmentation. The results can be unreliable when the segmentation base is not accurate. The process of segmentation followed by shape analysis has shown to be sub-optimal in various situations, such as where the segmentation model has limited ability to encode high-level shape priors. To circumvent this challenge, approaches in accordance with various embodiments can determine an accurate shape of object while performing segmentation, which can improve the accuracy of the segmentation. One example of such a system 200 is illustrated in FIG. 2. In this example, image data 202, such as data from a CT or MRI scanner, is received for processing. This can be received to a recurrent neural network (RNN), for example, that includes an architecture that is based at least in part upon an encoder 204 and a decoder 206. The network can extract features of the input image data 204 that can be used for two different purposes, as correspond to two different branches of the architecture. As illustrated, along a first branch the extracted image features can be used to generate a segmentation mask 208, for example, which can represent those voxels that correspond to the object of interest, such as the organ to be analyzed. This mask can be compared against the ground truth mask 210 during training as discussed in more detail later herein.

The extracted image features can also be provided to a second branch that can generate a point cloud representative of the surface of the object of interest. As discussed in more detail elsewhere herein, the point cloud can be used to constrain the relevant network parameters, which can cause the mask to more accurately represent the organ by being having the weights determined in part by the determined surface shape. The network parameters can include any appropriate parameters of layers of the network, as may include weights and biases associated with a loss or optimization function, that can be updated using, for example, backpropagated information associated with a gradient descent, among other such options. In this example, the second branch receives the extracted image features to a coarse-to-fine feature projection module 212, which can then pass the fine feature data to a point cloud generator 214, which can generate a point cloud 216 that is representative of the surface of the object of interest. A point cloud evaluator 220 can compare the inferred point cloud 216 against real (or ground truth) point cloud data for the object. As illustrated, one or more loss functions can be utilized to attempt to minimize the loss when determining weight values for the network. The combination of loss functions can help improve accuracy of the loss minimization. Repulsion regularization 224 can also be used at the local and global scales to force points to be close to the object surface while also constraining the points to be relatively evenly distributed over the surface. Layers of the neural network can have the weight values updated concurrently from the segmentation branch and the point cloud generator branch, which can cause the segmentation to be constrained to more closely correspond to the surface shape of the object.

When modeling the surface along the point cloud branch, an effective shape representation can be directly extracted from raw image via a trained neural network (e.g., a convolutional neural network (CNN)) for image-to-point cloud translation. An example CNN model can transfer its inputs to point cloud representations that are substantially evenly distributed on the surface of target objects, such as may correspond to organs or other objects being imaged for analysis. Various embodiments can utilize a set of geometric supervisions that jointly encourage the learning of organ shape priors which can be learned in an end-to-end fashion. Moreover, the learning of shape representations has driven the network to be more sensitive to the organ surface and thus, in turn, it can benefit the task of (organ) segmentation. A CNN model-based approach in accordance with various embodiments can be effective for learning shape representations from abdominal CT images with multiple organs, such as the liver, spleen, and pancreas. Also, there can be benefits to using models such as the 3D U-Net segmentation model when it is optimized with shape representation learning in accordance with various embodiments.

As mentioned, conventional approaches do not provide the level of accuracy desired for many applications, which can be particularly problematic for applications such as clinical diagnosis and treatment planning. With the rapid development of computer aided diagnosis (CAD), shape analysis has been widely investigated in many applications, including organ reconstruction, segmentation, detection, and modelling of pathologies. As an example, a shape generative model has been utilized for heart atrial reconstruction. In another example, a probabilistic shape clustering framework has been used for classification of cardiac left ventricles with respect to pathological groups. These methods usually follow the detached procedures of first obtaining object segmentation and then conducting shape analysis. However, this can be less than optimal when the segmentation model (as may be based at least in part upon a convolutional neural network (CNN)) has limited ability to encode high-level shape priors.

Segmenting volumetric images can be important for building shape analysis models as these are often used to produce shape representations, such as binary label maps, surface meshes, and point clouds. Manual delineation of target objects can provide reliable segmentations, but it is not scalable for analysis of large data sets for at least some use cases. To remedy this problem, one can obtain automatic segmentations via machine learning methods, as may include or utilize active shape/appearance models, multi-atlas-based segmentation, and CNN-based segmentation models. Deep learning-based approaches have proven to be capable of learning descriptive and discriminative feature representations useful for precise object segmentation. However, conventional CNN-based segmentations are limited by the corresponding pixel-level prediction mechanism, which is unable to account for higher-order properties, such as shape priors. Thus, it is challenging to obtain strong segmentation models that are aware of the underlying organ shape distribution.

Approaches in accordance with various embodiments can circumvent this challenge by, for example, directly extracting an organ shape representation from raw images by leveraging the power of deep learning. A deep learning architecture can be utilized that includes a two-branch point generator to translate two-dimensional (2D) images into point clouds in three-dimensional (3D) space, representing the reconstruction of target objects. In some approaches 2D images can be translated into surface meshes of the targeted objects, or objects of interest. Such approaches empirically prove that it is possible to translate image features into points and, more specifically, to translate pixel lattices into coordinates of locations in 3D space. Generally, the translation model first converts input images into high-level complex hierarchical features using its lower network layers. Then, the deep feature is mapped to surface points via non-linear transformation, such as a fully connected layer or multi-layer perceptron (MLP). Thus, the translation model can inherit powerful feature representation learning capabilities from the deep network architecture, while the point cloud output formation enables the generation of supervision signals that encodes critical shape priors. The model can also be end-to-end trainable, which can provide a globally optimized solution for shape representation learning in at least some embodiments.

Approaches in accordance with some embodiments utilize image-to-point translation that can directly extract organ shape representations from, for example, raw medical images. A deep network configuration can be utilized that supports the translation between 3D medical images and surface point clouds. A set of geometric supervisions can be used that jointly optimize the translation model. Such a method has been demonstrated to be effective with extensive experiments involving with multiple organs, such as the liver, pancreas, and spleen. Interactions between shape representation learning and organ segmentation are also described herein.

An initial example will be described with respect to translating computerized tomography (CT) and/or magnetic resonance imaging (MRI) images into surface point clouds of target organs. Other examples could include, for example, data from ultrasound scans or other such processes. The translation is achieved in some embodiments via a coarse-to-fine point generator and a set of jointly optimized objective functions, which encode shape priors of the target organ. A coarse-to-fine (C2F) surface point generator can be utilized, as may relate to a point set generation network, but a generation network such as a two-branch generator can generate points that locate on a too-smoothed outline of the target organ. These points can thus fail to recover sufficient detail of the surface, as the whole image is used to generate each of the surface points. Based in part upon this observation, the C2F generator can be used to fine-tune the location of each surface point using local image statistics in addition to global features.

In this example, an initial point generator is used that generates points at the coarse level as $\mathcal{F}_{init}$ and takes in CNN image feature X of the whole image as its input. The point set can be generated by:

$$P_0 = \mathcal{F}_{init}(X; \Theta_{init}),$$

where subscript 0 is used to identify the point set at the coarse level, and $\Theta_{init}$ is used to represent network parameters. Intuitively, the solution for $\mathcal{F}_{init}$ exists and its simplest form can be decomposed as a combination of multiple matrix multiplications. For simplicity, the case can be considered in two-dimensional space that:

$$P_0 = [P_0^x; P_0^y] = b(X)^T \Theta_{init} = b(X)^T [W^x; W^y]$$

where $P_0^x$, $P_0^y$ are coordinate components of $P_0$ at the x and y dimensions, respectively. Besides, b(·) is an operation to binarize and vectorize the input X, and $W^x$ and $W^y$ are the learnable parameter matrices. The point coordinate at each dimension can be obtained as $P_0^x = b(X)^T W^x$ and $P_0^y = b(X)T$ Wy, respectively. Practically, a convolutional neural network (CNN) can be used to transfer the input raw medical image I to X as $X = \mathcal{F}_{cnn}(I, \Theta_{cnn})$ and then optimize the stacked $\mathcal{F}_{cnn}$ and $\mathcal{F}_{init}$ end-to-end via stochastic gradient descend (SGD).

The generated initial points in $P_0$ are located on a smoothed surface outline failing to represent the target surface with sufficient detail. To remedy this, a coarse-to-fine (C2F) point mapping function can be used to refine the final point location with local image feature information. Formally, an example C2F mapping function can be given by:

$$P_1 = F_{c2f}(X, P_0; \Theta_{c2f})$$

where $P_1$ is the output of the refined point set. In function $F_{c2f}$, $P_0$ is applied to index the corresponding local image features from X. A point feature indexing (PFI) operation can be defined in a similar spirit as ordinary feature map pooling in convolutional neural networks (CNN), such as for maximum and average pooling. Instead of generating the target feature index via the maximum or average operation over the CNN feature map, however, approaches in accordance with various embodiments can utilize the predicted surface points as indices to the feature X. Meanwhile, in order to include sufficient local information for a local index, the image features of a sub-region can be extracted, such as by using a cube centered at the target position in the three-dimensional feature space. For computational efficiency, the dimensionality of the indexed feature can be reduced using a sparse local indexing strategy that only selects features located at the diagonals of the selected regions. For a more clear presentation, the following illustrates a two-dimensional example:

$$M_{pfi}(X, P_0(i)) = \underbrace{[e]}_{single\ indexing} \Rightarrow \underbrace{\begin{bmatrix} a & b & c \\ d & e & f \\ g & h & i \end{bmatrix}}_{sub-region\ indexing} \Rightarrow \underbrace{\begin{bmatrix} a\ c \\ e \\ g\ i \end{bmatrix}}_{sparse\ indexing}$$

where the single indexing uses the $i^{th}$ point in $P_0$ to locate the feature [e], and the sub-region indexing extracts the 3×3 region that centered at $P_0(i)$, and lastly, the sparse indexing keeps the feature skeleton for generating the final indexed feature as $M_{pfi}(X, P_0(i)) = [a, c, e, g, i]^T$.

Given the fact that the projected image feature $M_{pfi}(X, P_0(i))$ contains only the local image information, learning of local point movement would be inherently easier than predicting the global coordinate. Thus to generate refined points, the C2F mapping function can be re-formulated with point movement propagation (PMP) as:

$$P_1 = \mathcal{F}_{c2f}(X, P_0; \Theta_{c2f}) = P_0 + \mathcal{F}_{c2f}^{pmp}(M_{pfi}(X, P_0); \Theta_{c2f})$$

7 where $\mathcal{F}_{c2f}^{pmp}(\cdot)$ translates the local image features into local point movements.

In practice, some of the points in $P_0$ will be located dose to the actual organ surface while the others could be far away. Therefore, a second movement propagation can be utilized to secure the convergence of the relevant point predictions. A second movement propagation can be performed using another C2F function, as may be given by:

$$P_2 = \mathcal{F}_{c2f}(X, P_1; \Theta_{c2f}) = P_1 + \mathcal{F}_{c2f}^{pmp}(M_{pfi}(X, P_1); \Theta_{c2f}).$$

The resulting network configuration for the proposed image-to-point cloud translation can consist of an initialization module $\mathcal{F}_{init}$ and two C2F modules. For presentation clarity, the first and second C2F modules can be denoted as $\mathcal{F}_{c2f\text{-}1}$ and $\mathcal{F}_{c2f\text{-}2}$, respectively. All of these modules can be implemented using standard deep learning components, such as discussed with respect to FIG. 3, which visually depicts a schematic of the proposed image-to-point translation model.

Various embodiments can utilize point-based training objectives, as may include Chamfer distance (CD), Earth Mover's distance (EMD), and repulsion loss (RL), among others. These objectives can be applied to an image-to-point translation model for shape prior learning. These objectives can compare the predicted point sets with the ground truth at the single point scale so that the generated points will be constrained to lie exactly on the organ boundaries. Meanwhile, these objectives can also supervise at the global point-cloud scale so that the generated point set will preserve global organ shape. However, these objectives are not sensitive to outliers in the generated point set. Thus, an adversarial learning (AL) loss can be utilized that works complementary to the former metrics to remove the outlier points. During model training, the AL-loss can be jointly optimized with CD, EMD, and RL to train the image-to-point translation model.

Given the ground truth points $P_{gt}$ and the predicted point set $P_2$, the Chamfer distance (CD) loss can be given by:

$$\mathcal{L}_{cd} = \frac{1}{|P_2|}\sum_{a \in P_2}\min_{b \in P_{gt}}\|a-b\|_2^2 + \frac{1}{|P_{gt}|}\sum_{b \in P_{gt}}\min_{a \in P_2}\|a-b\|_2^2,$$

where $|\cdot|$ is the cardinality of point sets, and a and b are individual points from the sets $P_2$ and $P_{gt}$, respectively. The first and second summation in the CD metric can individually regularize $P_2$ at the local and global scales, respectively. Specifically, the first summation of CD is the point-to-surface (P2S) distances that force the points in $P_2$ to be close to the object surface, while the second summation is the surface-to-point (S2P) distance that constrains points in $P_2$ to be evenly distributed over the surface so that the organ shape priors are being preserved.

Consider $P_{gt}$ and $P_2$ to be of equal size $|P_{gt}|=|P_2|$. The Earth Mover's distance (EMD) can then be given by:

$$\mathcal{L}_{emd} = \min_{\phi:P_2 \to P_{gt}}\frac{1}{|P_2|}\sum_{x \in P_2}\|x - \phi(x)\|_2,$$

where $\phi: P_2 \to P_{gt}$ is a bijection. Comparing with CD, EMD also introduces local and global scales of supervisions to the generated points. Moreover, the one-to-one correspondence introduced by $\phi$ would further separate points in $P_2$ so as to avoid multiple points densely distributed at the same spot.

The repulsion loss (RL) is an unsupervised regularization term that can be given by:

$$\mathcal{L}_{rep} = \frac{1}{|P_\#|}\sum_{a \in P_\#}\sum_{a' \in N(a)}\eta(\|a-a'\|_2)\omega(\|a-a'\|_2),$$

where $P_\#$ represents either of the predicted point sets $P_0$, $P_1$ and $P_2$. While $N(a)$ is the set of neighbors of point a, and $\eta(\cdot)$ and $\omega(\cdot)$ are the repulsion term and fast-decaying weight function, respectively.

The RL can be applied not only to the final output $P_2$ but also to the intermediate results $P_0$ and $P_1$ so that points in both $P_0$ and $P_1$ are regularized to repulse its neighbor points away for an evenly separated distribution. This can be important for the C2F module because the well separated points can result in different indexed point-wise features and thus generate better separated and fine-tuned points.

In various embodiments, the predicted points can be refined using with an adversarial learning (AL) loss, which can function complementary to the former geometric supervisions. As discussed above, CD, EMD, and/or RL can be defined to minimize the averaged error over the whole point set. This can result in lower sensitivity to outliers in the data, which might consist only on a small portion of the generated points. However, outliers can have a significant negative impact on the overall generated organ shape. To remedy this, an AL-based loss (AL-loss) can be applied to remove outliers. Intuitively, the discriminator in AL-loss works as an attention model to detect the abnormally located outliers, such that the AL-loss can assign higher weights to the loss generated by outliers.

The loss for AL can be given by:

$$\mathcal{L}_{adv} = \min_{\mathcal{D}}\max_{\mathcal{G}}\left[H(\mathcal{D}(\mathcal{G}(X_i, X_{i+1}, \ldots)), 0) + H(\hat{P}_g)\right]$$

where $\mathcal{D}(\bullet)$ is a PointNet classifier, $G(\bullet)$ is the proposed C2F point generator, $H(\bullet,\bullet)$ is the cross entropy loss function, and $\hat{P}_{gt}$ are the ground truth surface points $P_{gt}$ with randomly added noise that generated from a specified range.

The overall objective for training of image-to-point translation in accordance with various embodiments can be given by:

$$\mathcal{L} = \sum_{L_i \in S}\lambda_i L_i + L_{seg},$$

where $S=\{\mathcal{L}_{cd}, \mathcal{L}_{emd}, \mathcal{L}_{rep}, \mathcal{L}_{adv}\}$ is the set of evaluation metrics, and $\lambda_i$ are scale factors to balance the losses. A cross-entropy segmentation loss $\mathcal{L}_{seg}$ can be used to supervise the CNN base $\mathcal{F}_{cnn}$ that generates image feature X. In model training, $\mathcal{L}_{seg}$, $\mathcal{L}_{cd}$, $\mathcal{L}_{emd}$, $\mathcal{L}_{rep}$ and $\mathcal{L}_{adv}$ values lie in the range from 1e-3 to 1e-1. Thus, $\lambda_{cd}$, $\lambda_{emd}$, $\lambda_{rep}$, and $\lambda_{adv}$ can be set to have values of 100, 100, 10, and 1 in at least one embodiment to balance the contribution of each part in the joint loss $\mathcal{L}$.

An image-to-point translation in accordance with one embodiment can be jointly optimized with organ segmentation. In one embodiment, $\mathcal{L}_{seg}$ is applied to training the CNN to generate image feature X. Here, X can perform to differentiate foreground and background pixels that benefits the generation of surface points, and vice versa. In the forward pass, the point generator is given by:

$$\mathcal{G}_{(I \to P)} = F_{cnn} \circ \underbrace{F_{init} \circ \mathcal{F}_{c2f-2} \circ \mathcal{F}_{c2f-2}}_{dense \to sparse}$$

which translates the image data I into point cloud P. Here, $\circ$ denotes the composition of two transformations. The image representation evolves from dense to sparse as it passes through the C2F point generator. Accordingly the backward pass can be viewed as an inverse mapping, given by:

$$\mathcal{G}_{(P \to I)} = \mathcal{G}_{(I \to P)}^{-1} = \underbrace{\mathcal{F}_{c2f-2}^{-1} \circ \mathcal{F}_{c2f-1}^{-1} \circ \mathcal{F}_{init}^{-1} \circ \mathcal{F}_{cnn}^{-1}}_{sparse \to dense},$$

that translates the point-wise (sparse) error gradients into a voxel-wise (dense) error gradient format and then is passed to update the lower convolutional layers in $\mathcal{F}_{cnn}$. Here, $(\bullet)^{-1}$ denotes the backward propagation. Therefore, the back-propagated geometric error gradients drive the lower convolutional layers to learn more effective image representations at the organ surface region, which helps to improve the task of organ segmentation as it can be observed in the following experimental results.

For experimental design, a baseline ad-hoc approach and an end-to-end approach can be utilized. The ad-hoc approach trains a 3D U-Net that segments the input medical image I into a segmented volumetric image $S_{ad}$. From $S_{ad}$, the surface point cloud $P_{ad}$ can be extracted through a marching cubes (MC) algorithm. For comparison, an end-to-end approach in accordance with one embodiment can train the 3D U-Net together with the proposed coarse-to-fine (C2F) point generator such that it simultaneously produces the segmented volumetric image $S_{e2e}$ and the corresponding surface point cloud $P_{e2e}$.

In one example experiment, the liver, pancreas, and spleen categories had 131, 281, and 41 annotated CT images, respectively. For each category, images were split randomly into 50%, 25%, and 25% for training, validation, and testing. For each image, the target organ is center cropped with 16-pixel padding and resized to $128'128'128^2$. Other than this, no further data pre-processing is implemented. The input patch containing the whole organ was retained so that point generator can learn shape priors of the target organ. For details of training, networks were initialized with Xavier initialization and trained from scratch with an Adam optimizer. The learning rate (5e-4) together with other hyper-parameters were all fixed for all sets so that changes observed in experiment results can be traced back to factors of interest. Using the validation data, the best model checkpoint was selected and its performance on the testing data reported.

In one example, the proposed C2F generator with its variation that trained without adversarial learning (AL) loss is compared with the two-branch point generator. The generated point clouds are evaluated with the EMD, P2S, and S2P metrics and the image-wise mean and standard deviations analyzed. C2F produced the best result over all tasks and its variation without AL-loss outperforms the two-branch approach in all cases except the EMD metric for spleen. The two-branch generator produces smoothed organ shapes lacking of local surface details. However, the C2F generator uses the proposed point feature indexing (PFI) layer and, going from coarse to fine, incrementally tunes the generated points towards a more detailed surface representation. On the other hand, AL-loss plays an important role on removing outlier points. C2F trained with and without AL-loss can be compared, and C2F with AL-loss presenting clean organ boundaries. Such findings support the conclusion that AL-loss helps the model to learn a strong prior of organ surface smoothness and it forces C2F to remove outlier points.

C2F can be compared with the 3D U-Net segmentation model in terms of the extracted shape representations. Specifically, $P_{ad}$ and $P_{e2e}$ can be evaluated with EMD and CD metrics. It was observed that $P_{e2e}$ marginally outperformed the segmentation model over all cases. Taking pancreas for example, $P_{e2e}$ reduced EMD and CD over $P_{ad}$ by 23% and 44%, respectively. Such a result validates the effectiveness of learning shape prior end-to-end. The C2F is trained under the proposed $\mathcal{L}_{emd}$, $\mathcal{L}_{cd}$, $\mathcal{L}_{rep}$, and $\mathcal{L}_{adv}$, losses that strongly incorporate information about the organ shape. However, the 3D U-Net is only trained with the $\mathcal{L}_{seg}$ loss which does not account for the higher-order shape priors. The generated binary label maps $S_{ad}$ and $S_{e2e}$ are compared in terms of case-wise Dice score and Hausdorff distance (HD). Specifically, for $S_{e2e}$ there are two variations: [3D U-Net+Two-Branch] and [3D U-Net+C2F].

Figure 3:
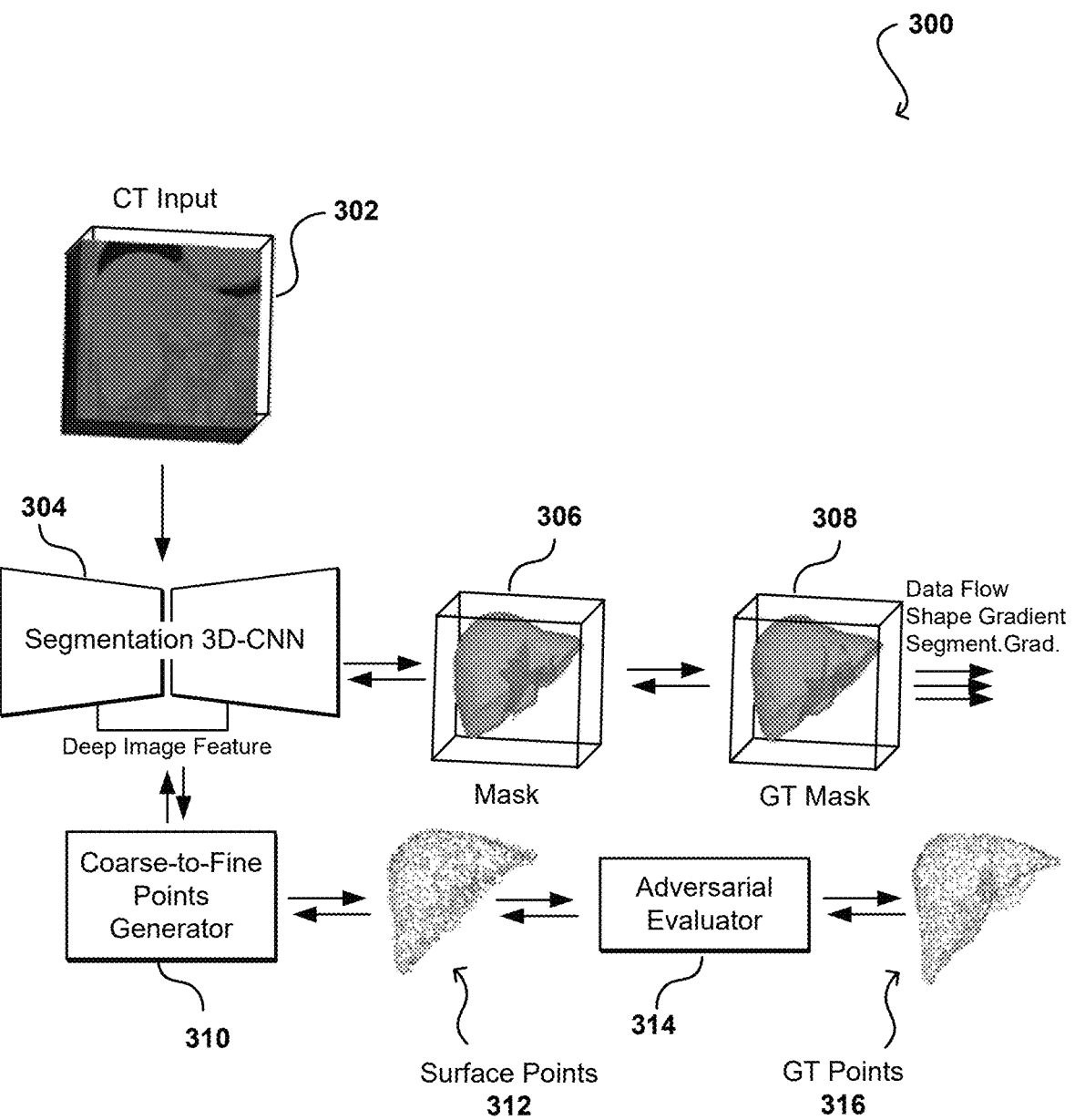
FIG. 3 illustrates components of an example model for image to point cloud translation that can be utilized in accordance with various embodiments.

FIG. 3 illustrates another example two-branch system 300 that can be utilized in accordance with various embodiments. In this example, input image data 302 is again received to a segmentation network. This image data can correspond to 2D or 3D data, such as may be generated as a result of a CT or MRI scan, among other such options. In some embodiments the data might be hybrid data, such as may include 2D image data and distance data obtained from a separate sensor. The segmentation model 304 can be a CNN, or other deep learning model or network, that is able to extract deep image features as discussed herein. The segmentation model can, along a segmentation branch, infer a segmentation mask 306 using the extracted features. The inferred mask 306 can be compared against a ground truth (GT) mask to determine the relative loss values, which can be used to adjust the weightings or other network parameters of the various layers. The output of the network, or various layers of the network, can include a shape gradient, segmentation gradient, and other such information.

The deep learning model 304 can also translate the image into a point cloud of surface points 312, such as by using a coarse-to-fine points generator 310 as discussed herein. The point cloud 312 can be compared against a point cloud 316 of ground truth data for the organ surface. The comparison can be performed using an adversarial evaluator 314 in this example. The loss values can be determined using one or more loss functions, and these values can be used to adjust the weightings or other network parameters of the deep learning model 304, which can help to improve the performance of the segmentation.

The trained model 304 can have incorporated strong shape priors. The extracted shape representation (i.e. surface point cloud) can perform better at organ reconstruction than its counterpart 3D U-Net segmentation model and a two-branch point generator according to experimental results. An image-to-point translation model in accordance with various embodiments can then serve as a strong baseline to facilitate investigations of shape analysis. Moreover, the shape representation learning can also serve to facilitate the CNN-based organ segmentation by introducing learned organ shape priors.

Figure 4:
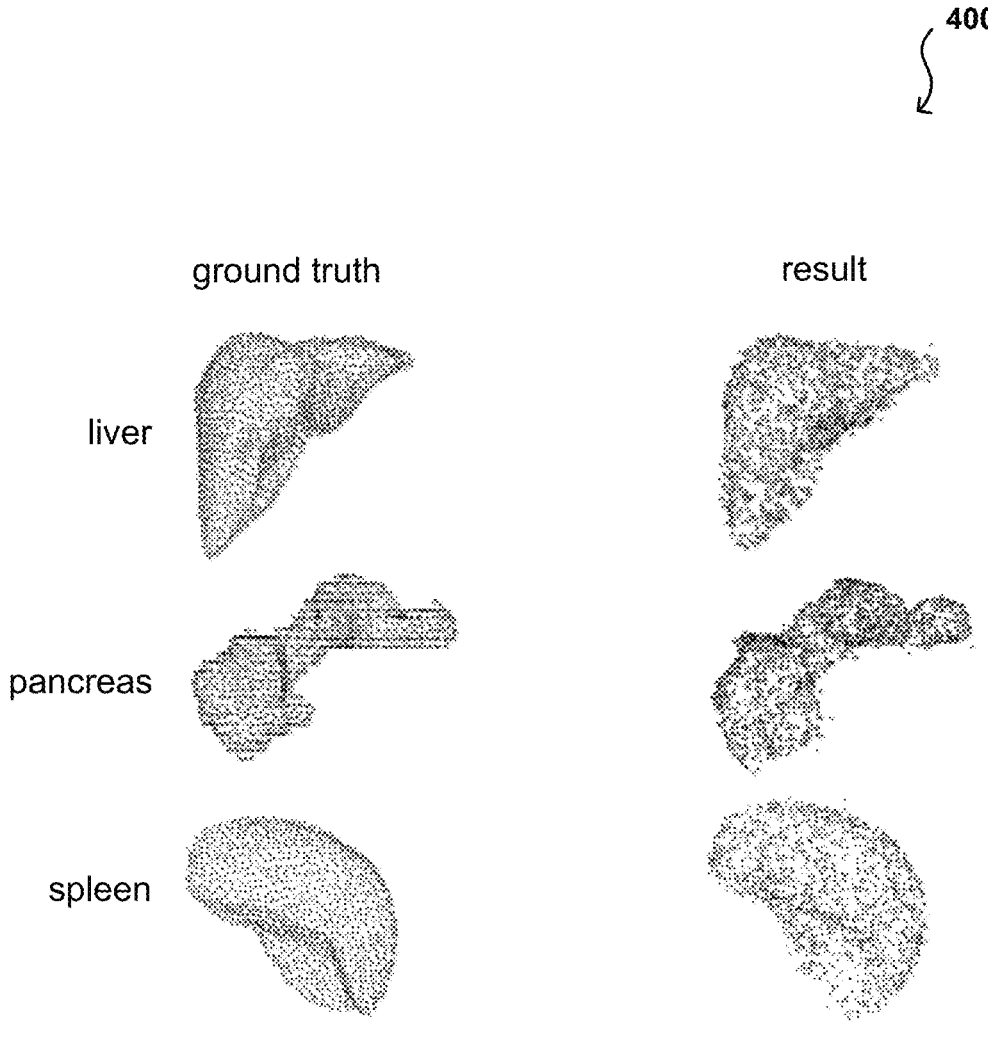
FIG. 4 illustrates an example visualization of surface point clouds that can be generated in accordance with various embodiments.

FIG. 4 illustrates a set of point clouds 400 that can be compared and/or produced using the adversarial evaluator, as may be used for adversarial training. As illustrated, the resulting point clouds on the right are inferred from the network. The inferred point clouds have very strong correlation to the ground truth point clouds on the left for various different organs. Thus, the inferred point clouds are substantially accurate representations of the surfaces of these organs, and can be used to constrain the segmentation by effectively setting approximate boundaries to be used when optimizing the various weightings, or minimizing the losses for various layers of the network.

Figure 5:
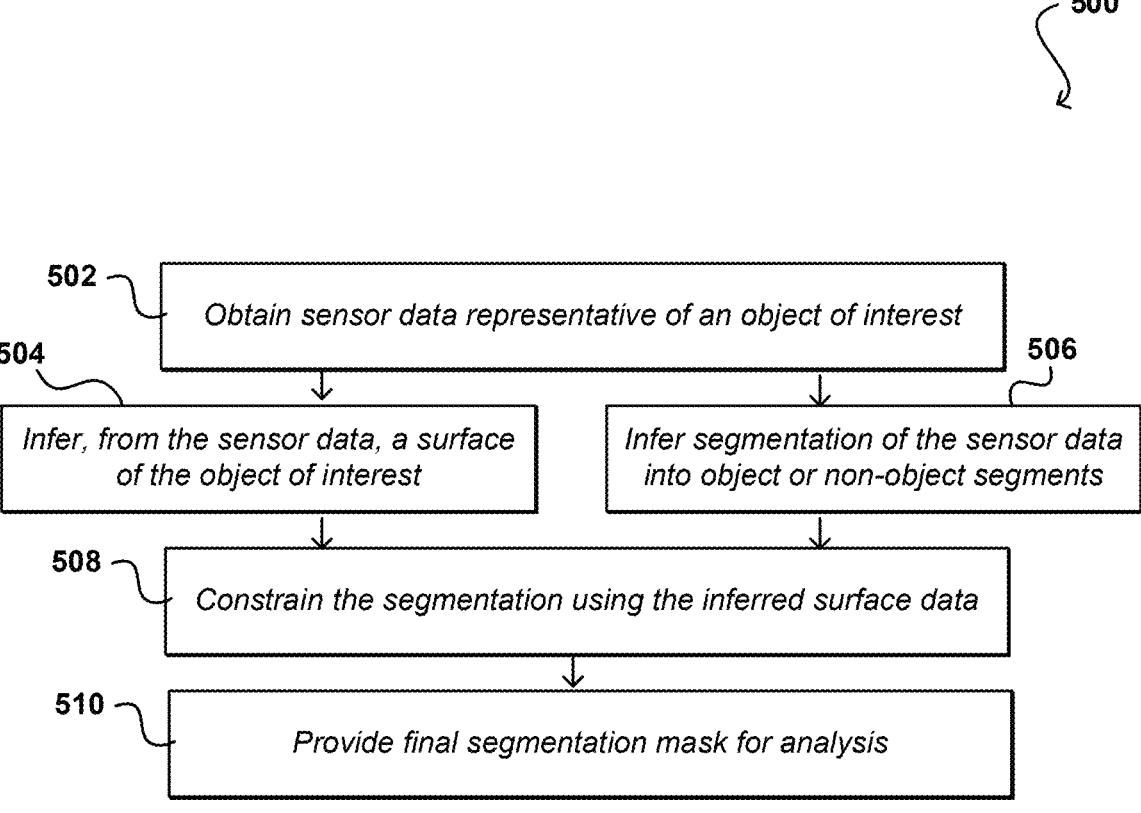
FIG. 5 illustrates a first example process for performing data segmentation that can be utilized in accordance with various embodiments.

FIG. 5 illustrates an example process 500 for segmenting data that can be utilized in accordance with various embodiments. It should be understood for this and other processes discussed herein that there can be additional, alternative, or fewer steps performed in similar or alternative orders, or in parallel, within the scope of the various embodiments unless otherwise stated. In this example, sensor data is obtained 502 that is representative of an object of interest. In many instances the sensor data will include image data (e.g., 2D or 3D image data) such as MRI or CT scan data, but the sensor data may also include other types of data discussed and suggested herein that may be captured by one or more sensors, as may include data captured using radar, LIDAR, an ultrasonic sensor, a depth sensor, a structured light sensor, an infrared camera, a motion sensor, and the like. In some embodiments the sensor data may be received from two or more sensors, such as 2D image data obtained from a camera and depth information received from a depth sensor in order to generate 3D data representative of an object.

In this example, the data is processed using one or more neural networks, although other models, processes, or approaches can be used as well as would be apparent to one of ordinary skill in the art in light of the teachings and suggestions contained herein. As mentioned, the process can have two branches, or sub-processes, that can execute in parallel in at least some embodiments. In this example, the sensor data is processed in a point cloud generation process to infer 504 a surface of the object of interest. This can include extracting features from the data and using those features to generate a point cloud that is representative of at least a portion of the surface of the object of interest. The sensor data can concurrently be processed in a segmentation process to infer 506 a segmentation of the sensor data into object or non-object segments. For 3D image data comprised of a plurality of voxels, this can include classifying each voxel as corresponding to the object, or not corresponding to the object. As mentioned, these processes can be performed as part of the same neural network in at least some embodiments, where one or more network parameters are adjusted based in part on the loss values, or other optimization values, determined from both processes. In this way, the segmentation can be constrained 508 using the inferred surface data. That is to say that the adjustment of weightings based on one or more loss functions for the point cloud generation can impact the adjustment of those weightings for the segmentation, where the adjusted weightings will simultaneously have to be optimized for both the segmentation and surface determinations. Constraining the segmentation to also have to minimize surface loss can improve the accuracy of the segmentation portion. Once the training and/or inference has completed, the final segmentation mask (or other set of segmentation data inferred from the network) can be provided 510 for analysis, such as to allow for measurements to be taken of the object using the voxels classified as corresponding to the object.

FIG. 6 illustrates another example process 600 for segmenting data that can be utilized in accordance with various embodiments. This process can be used with, or separate from, the process described with respect to FIG. 5. In this example, image data is received 602 that includes a representation of at least one object of interest. Examples discussed herein relate to human organs, but the objects can be any object of any appropriate dimension for which measurement or analysis is to be performed, or for which there is otherwise a desire to determine or isolate the segment or portion of the image data that corresponds to a given object of interest, such as for generating object models or visualizations, etc. Accordingly, the data can be provided to a system or process utilizing one or more neural networks, such as generative adversarial networks (GANs) or convolutional neural networks (CNNs), which can be trained to infer segmentations for input image data and other such data as discussed herein. The system can analyze the image data to extract 604 a set of image features useful in identifying the object of interest. The features can be any appropriate features known or used for such processes, such as those used in computer vision. The features can be analyzed concurrently for two different but related purposes, as may correspond to different branches as discussed herein. As a first part of the analysis, segmentation can be performed 606 using the image features to attempt to classify voxels (or other pixels or related information) of the image data as corresponding to the object or to a background (or other non-object region). The inferred segmentation can be compared 608 against a ground truth segmentation in order to update 614 network parameters, such as weight parameters of a loss function, and improve the accuracy of the segmentation. In parallel, the image features can be analyzed to generate 610 a point cloud representative of the surface of the object. The inferred point cloud for the surface can be compared 612 against a ground truth point cloud for the surface, with network parameters being updated 614 accordingly, where the network parameters can include weight parameters for one or more loss functions. As illustrated, the network parameters are updated based on the point cloud for the surface as well as the segmentation, which effectively constrains the segmentation to voxel that are more closely aligned with the inferred surface. In other words, the weight parameters are updated to minimize losses for both the surface and the segmentation, which causes the segmentation to more closely align to the object surface. In this example the process can continue until it is determined that the network converges 616 or another end criterion is satisfied. Once converged, the inferred segmentation mask can be provided 618 for use, such as to determine 620 object measurements using voxels from the image data that are classified as object voxels per the segmentation mask. In various instances, the ability to apply effective shape constraints on segmentation can help to improve model robustness when the amount of available image data is limited. In at least some embodiments, once the network is successfully trained then the point cloud branch can be ignored and segmentation of new image or volume data can be performed using only the segmentation branch. In some embodiments sparse point clouds may be generated and utilized rather than dense point clouds, as may be useful for landmark predictions or other such applications.

Figure 7:
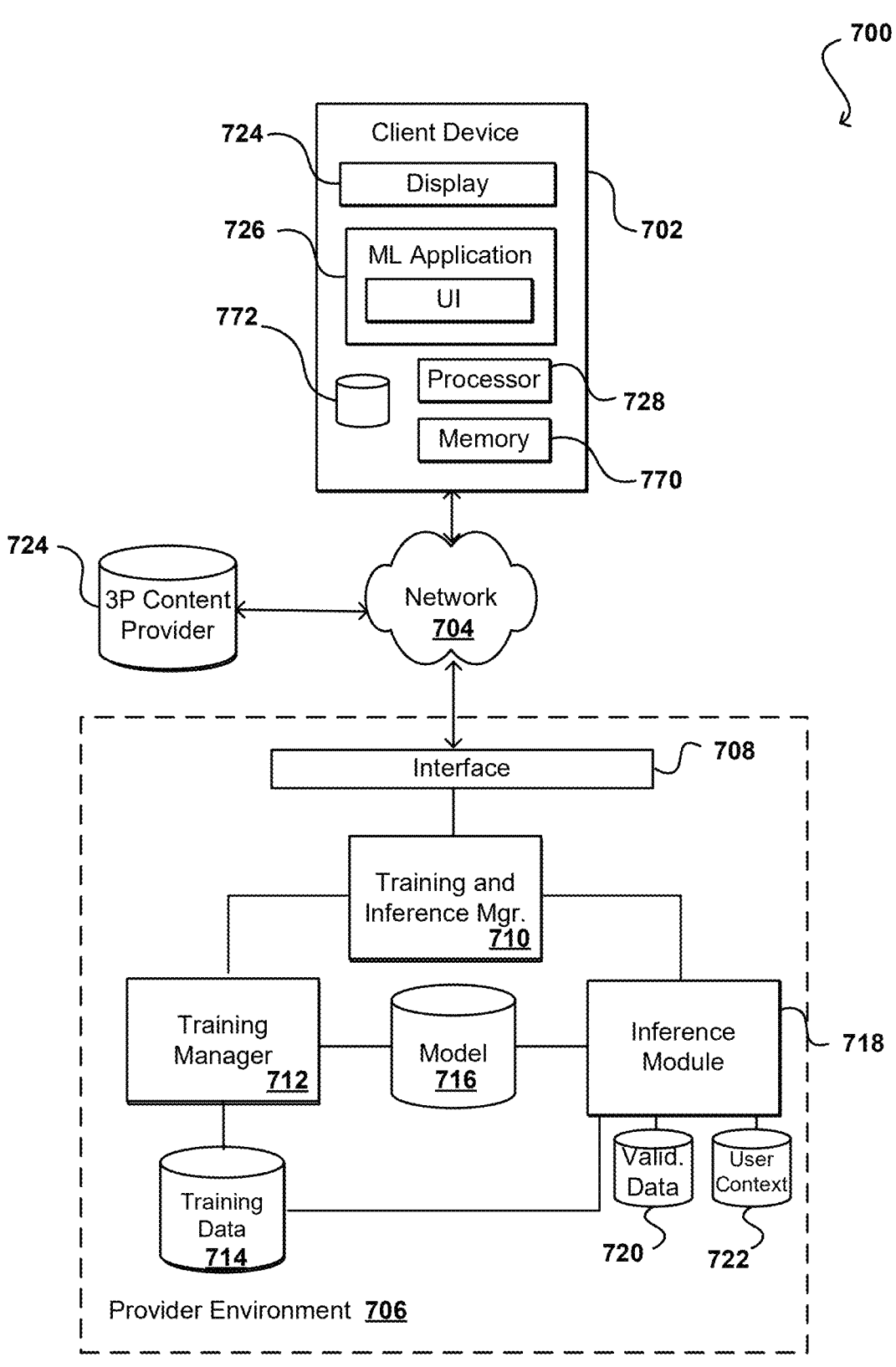
FIG. 7 illustrates an example environment in which aspects of the various embodiments can be implemented.

FIG. 7 illustrates components of an example system 700 that can be used to train and utilize machine learning in accordance with various embodiments. As will be discussed, the various components can be provided by various combinations of computing devices and resources, or a single computing system, which may be under the control of a single entity or multiple entities. Further, various aspects may be triggered, initiated, or requested by different entities. For example, in some embodiments the training of a neural network might be instructed by a provider associated with the provider environment 706, while in other embodiments the training might be requested by a customer or other user having access to the provider environment through a client device 702 or other such resource. The training data (or data to be analyzed by the trained neural network) can be provided by the provider, the user, or a third party content provider 724, among other such options.

In this example, a user is able to submit requests across at least one network 704 to be received to a provider environment 706. The client device may be any appropriate electronic and/or computing devices enabling the user to generate and send such requests, as may include desktop computers, notebook computers, computer servers, smartphones, tablet computers, gaming consoles (portable or otherwise), computer processors, computing logic, and set-top boxes, among other such options. The network(s) 704 can include any appropriate network for transmitting the request or other such data, as may include the Internet, an intranet, an Ethernet, a cellular network, a local area network (LAN), a network of direct wireless connections among peers, and the like.

Requests can be received to an interface layer 708, which can forward the data to a content manager 710 in this example. The content manager can be a system or service including hardware and software for managing requests and service corresponding data or content in at least some embodiments. The content manager can receive a request to train a neural network, and can provide data for the request to a training manger 712. The training manager 712 can select an appropriate model or network to be used, if not specified by the request, and can train the model using relevant training data. In some embodiments the training data can be a batch of data stored to a training data repository 714, received from the client device 702 or obtained from a third party provider 724, among other such options. The training manager 712 can be responsible for training the data, such as by using a LARC-based approach as discussed herein. The network can be any appropriate network, such as a recurrent neural network (RNN) or convolutional neural network (CNN), among other such options. Once a network is trained and successfully evaluated, the trained network can be stored to a model repository 716, for example, that may store different models or networks for users, applications, or services, etc. As mentioned, in some embodiments there may be multiple models for a single application or entity, as may be utilized based on a number of different factors.

At a subsequent point in time, a request may be received from the client device 702 (or another such device) for content or data that is at least partially determined or impacted by the trained neural network. The request can include, for example, input data to be processed using the neural network to obtain one or more inferences or other output values, classifications, or predictions. The input data can be received to the interface layer 708 and directed to the inference module 718, although a different system or service can be used as well in various embodiments. The inference module 718 can obtain the appropriate trained network, such as a trained deep neural network (DNN) as discussed herein, from the model repository 716 if not already stored locally to the inference module 718. The inference module 718 can provide the data as input to the trained network, which can then generate one or more inferences as output. This may include, for example, a classification of an instance of the input data. The inferences can then be transmitted to the client device 702 for display or other communication to the user. Context data for the user may also be stored to a user context data repository 722, which may include data about the user which may be useful as input to the network in generating the inferences, or determining the data to return to the user after obtaining the instances, among other such options. Relevant data, which may include at least some of the input or inference data, may also be stored to a local database 720 for processing future requests. In some embodiments, the user can use account or other information to access resources or functionality of the provider environment. If permitted and available, user data may also be collected and used to further train the models, in order to provide more accurate inferences for future requests. Requests may be received through a user interface to a machine learning application 726 executing on the client device 702 in some embodiments, and the results displayed through the same interface. The client device can include resources such as a processor 728 and memory 730 for generating the request and processing the results or response, as well as at least one data storage element 732 for storing data for the machine learning application 726.

In various embodiments a processor 728 (or a processor of the training manager 712 or inference module 718) will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

As mentioned, various embodiments take advantage of machine learning. As an example, deep neural networks (DNNs) developed on processors have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand. Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, a computing platform can deliver the performance required for deep neural network-based artificial intelligence and machine learning applications.

Figure 8:
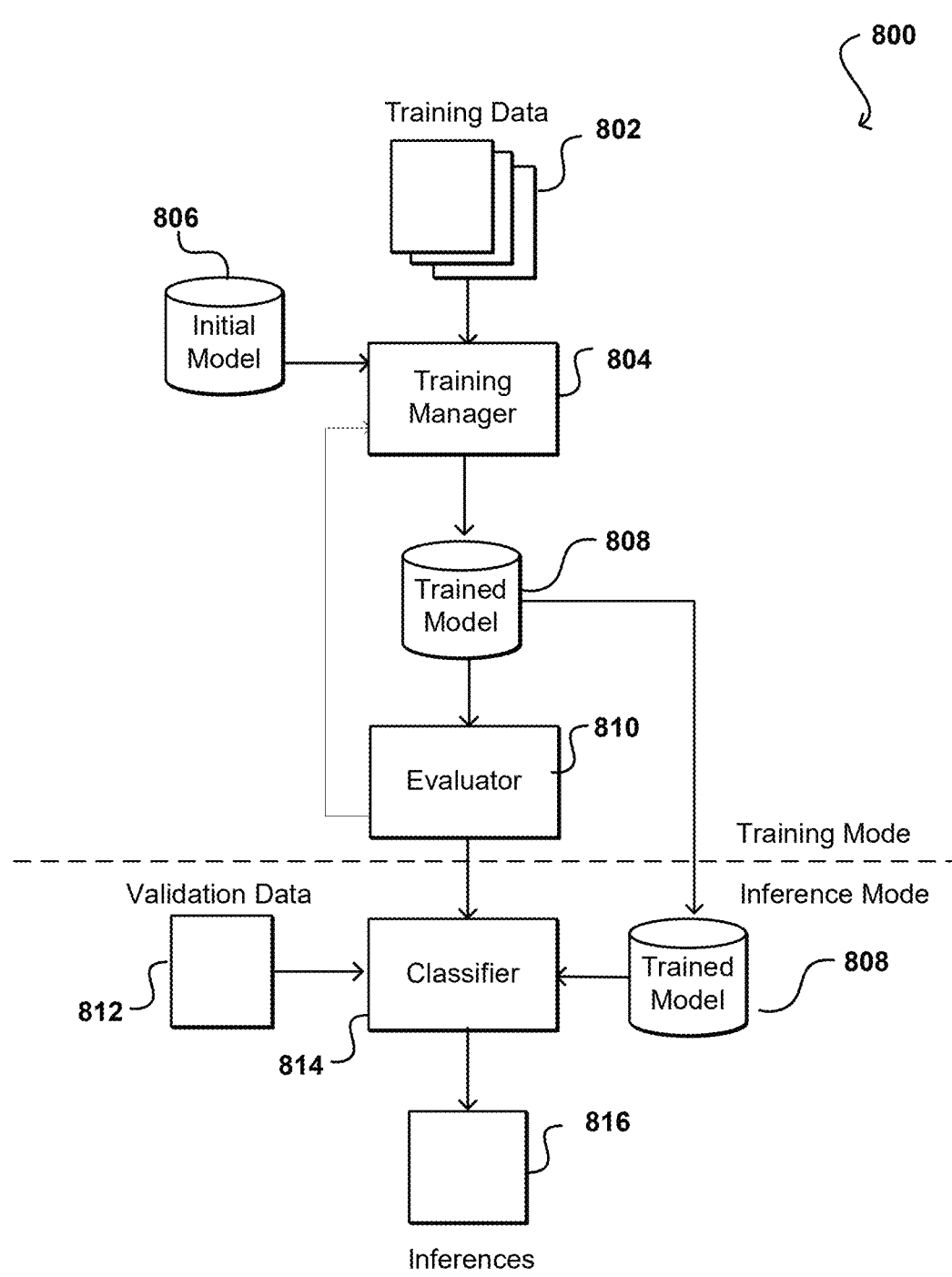
FIG. 8 illustrates an example system for training an image synthesis network that can be utilized in accordance with various embodiments.

FIG. 8 illustrates an example system 800 that can be used to classify data, or generate inferences, in accordance with various embodiments. Various types of predictions, labels, or other outputs can be generated for input data as well, as should be apparent in light of the teachings and suggestions contained herein. Further, both supervised and unsupervised training can be used in various embodiments discussed herein. In this example, a set of training data 802 (e.g., classified or labeled data) is provided as input to function as training data. The training data can include instances of at least one type of object for which a neural network is to be trained, as well as information that identifies that type of object, as well as information that identifies that type of object. For example, the training data might include a set of images that each includes a representation of a type of object, where each image also includes, or is associated with, a label, metadata, classification, or other piece of information identifying the type of object represented in the respective image. Various other types of data may be used as training data as well, as may include text data, audio data, video data, and the like. The training data 802 in this example is provided as training input to a training manager 804. The training manager 804 can be a system or service that includes hardware and software, such as one or more computing devices executing a training application, for training the neural network (or other model or algorithm, etc.). In this example, the training manager 804 receives an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 804 can select an initial model, or other untrained model, from an appropriate repository 806 and utilize the training data 802 to train the model, generating a trained model 808 (e.g., trained deep neural network) that can be used to classify similar types of data, or generate other such inferences. In some embodiments where training data is not used, the appropriate initial model can still be selected for training on the input data per the training manager 804.

A model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified.

In one example, a training manager 804 can select from a set of machine learning models including binary classification, multiclass classification, and regression models. The type of model to be used can depend at least in part upon the type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager 804 in some embodiments may automatically select the appropriate learning algorithm based on the type of target specified in the training data source. Machine learning algorithms can accept parameters used to control certain properties of the training process and of the resulting machine learning model. These are referred to herein as training parameters. If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data. If the patterns are few and simple, the resulting model will be small. Input data that has a large number of raw attributes (input columns) or derived features (outputs of the data transformations) will likely have more patterns found and stored during the training process.

In some embodiments, the training manager 804 can make multiple passes or iterations over the training data to attempt to discover patterns. There may be a default number of passes, such as ten passes, while in some embodiments up to a maximum number of passes may be set, such as up to one hundred passes. In some embodiments there may be no maximum set, or there may be a convergence criterion or other factor set that will trigger an end to the training process. In some embodiments the training manager 804 can monitor the quality of patterns (i.e., the model convergence) during training, and can automatically stop the training when there are no more data points or patterns to discover. Data sets with only a few observations may require more passes over the data to obtain sufficiently high model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict an object. The data might be sorted by object type before uploading. The algorithm can then process the data alphabetically by object type, encountering only data for a certain object type first. The model will begin to learn patterns for that type of object. The model will then encounter only data for a second object type, and will try to adjust the model to fit that object type, which can degrade the patterns that fit that the first object type. This sudden switch from between object types can produce a model that does not learn how to predict object types accurately. Shuffling can be performed in some embodiments before the training data set is split into training and evaluation subsets, such that a relatively even distribution of data types is utilized for both stages. In some embodiments the training manager 804 can automatically shuffle the data using, for example, a pseudo-random shuffling technique.

When creating a machine learning model, the training manager 804 in some embodiments can enable a user to specify settings or apply custom options. For example, a user may specify one or more evaluation settings, indicating a portion of the input data to be reserved for evaluating the predictive quality of the machine learning model. The user may specify a policy that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 808 can be provided for use by a classifier 814 in classifying (or otherwise generating inferences for) validation data 812. As illustrated, this involves a logical transition between a training mode for the model and an inference mode for the model. In many embodiments, however, the trained model 808 will first be passed to an evaluator 810, which may include an application, process, or service executing on at least one computing resource (e.g., a CPU or GPU of at least one server) for evaluating the quality (or another such aspect) of the trained model. The model is evaluated to determine whether the model will provide at least a minimum acceptable or threshold level of performance in predicting the target on new and future data. If not, the training manager 804 can continue to train the model. Since future data instances will often have unknown target values, it can be desirable to check an accuracy metric of the machine learning on data for which the target answer is known, and use this assessment as a proxy for predictive accuracy on future data.

In some embodiments, a model is evaluated using a subset of the training data 802 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 808 and the evaluator 810 can determine the accuracy of the model by comparing the ground truth data against the corresponding output (or predictions/observations) of the model. The evaluator 810 in some embodiments can provide a summary or performance metric indicating how well the predicted and true values match. If the trained model does not satisfy at least a minimum performance criterion, or other such accuracy threshold, then the training manager 804 can be instructed to perform further training, or in some instances try training a new or different model, among other such options. If the trained model 808 satisfies the relevant criteria, then the trained model can be provided for use by the classifier 814.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources, but has failed to generalize the patterns in the data. Overfitting often occurs when the training data includes all of the data used in the evaluation. A model that has been over fit may perform well during evaluation, but may fail to make accurate predictions on new or otherwise validation data. To avoid selecting an over fitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer data (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

In the example system 800 of FIG. 8, the trained model 810 after evaluation is provided, or made available, to a classifier 814 that is able to use the trained model to process validation data. This may include, for example, data received from users or third parties that are not classified, such as query images that are looking for information about what is represented in those images. The validation data can be processed by the classifier using the trained model, and the results 816 (i.e., the classifications or predictions) that are produced can be sent back to the respective sources or otherwise processed or stored. In some embodiments, and where such usage is permitted, the now-classified data instances can be stored to the training data repository, which can be used for further training of the trained model 808 by the training manager. In some embodiments the model will be continually trained as new data is available, but in other embodiments the models will be retrained periodically, such as once a day or week, depending upon factors such as the size of the data set or complexity of the model.

The classifier 814 can include appropriate hardware and software for processing the validation data 812 using the trained model. In some instances the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 100 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

FIG. 9 illustrates an example neural network 900 that can be trained or otherwise utilized in accordance with various embodiments. In this example the statistical model is an artificial neural network (ANN) that includes a multiple layers of nodes, including an input layer 902, an output layer 906, and multiple layers 904 of intermediate nodes, often referred to as "hidden" layers, as the internal layers and nodes are typically not visible or accessible in conventional neural networks. Although only a few intermediate layers are illustrated for purposes of explanation, it should be understood that there is no limit to the number of intermediate layers that can be utilized, and any limit on the layers will often be a factor of the resources or time required for processed using the model. As discussed elsewhere herein, there can be additional types of models, networks, algorithms, or processes used as well, as may include other numbers or selections of nodes and layers, among other such options. Validation data can be processed by the layers of the network to generate a set of inferences, or inference scores, which can then be fed to a loss function 908.

In this example network 900, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (in other words, translating words to vectors), CNN architecture definition (for example, filter sizes, number of filters), stochastic gradient descent parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of an instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Figure 10A:
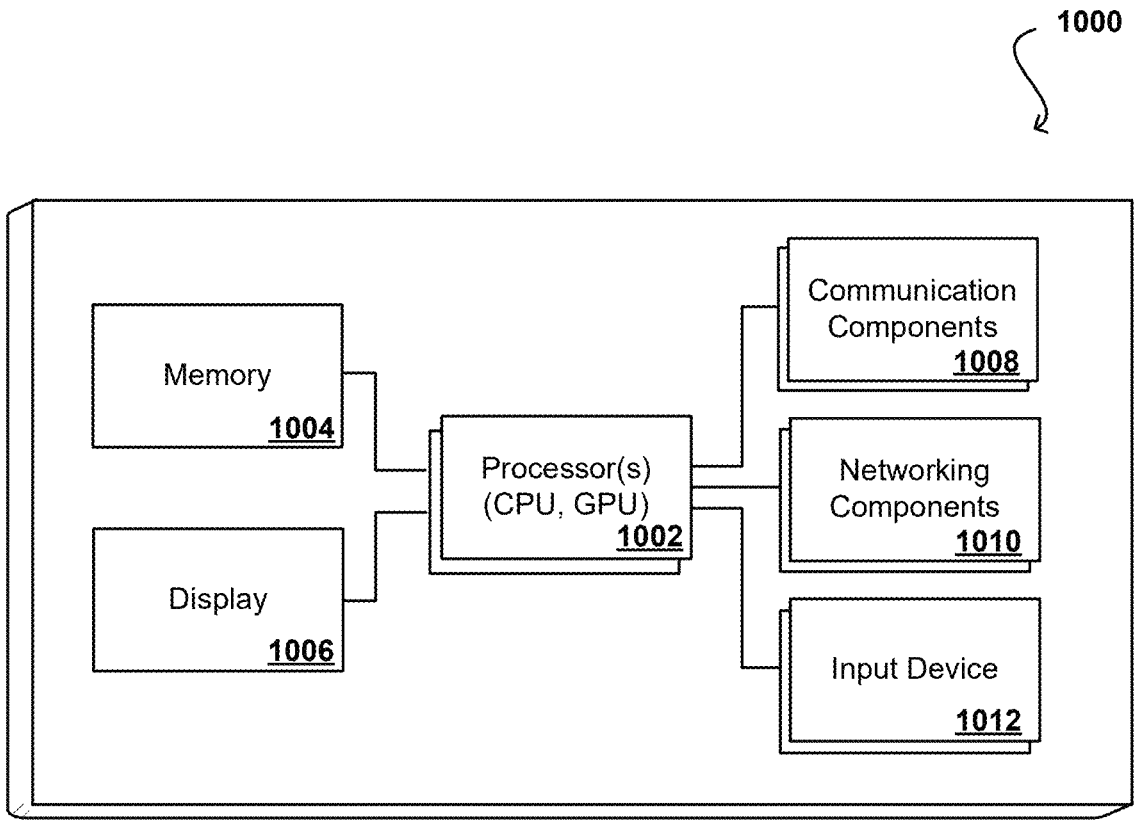
FIGS. 10A and 10B illustrate example components of a computing device that can be used to implement aspects of the various embodiments.

FIG. 10A illustrates a set of basic components of a computing device 1000 that can be utilized to implement aspects of the various embodiments. In this example, the device includes at least one processor 1002 for executing instructions that can be stored in a memory device or element 1004. As would be apparent to one of ordinary skill in the art, the device can include many types of memory, data storage or computer-readable media, such as a first data storage for program instructions for execution by the processor 1002, the same or separate storage can be used for images or data, a removable memory can be available for sharing information with other devices, and any number of communication approaches can be available for sharing with other devices. The device typically will include some type of display element 1006, such as a touch screen, organic light emitting diode (OLED) or liquid crystal display (LCD), although devices such as portable media players might convey information via other means, such as through audio speakers. As discussed, the device in many embodiments will include at least communication component 1008 and/or networking components 1010, such as may support wired or wireless communications over at least one network, such as the Internet, a local area network (LAN), Bluetooth®, or a cellular network, among other such options. The components can enable the device to communicate with remote systems or services. The device can also include at least one additional input device 1012 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

Figure 10B:
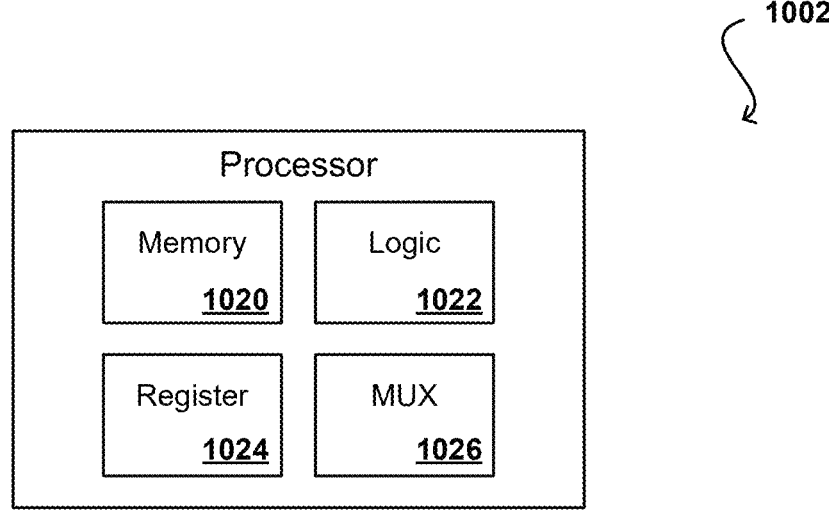

FIG. 10B illustrates example components of one of the processors 1002 of FIG. 10A. In this example, the processor 1002 can include logic for performing certain tasks, such as may include frame generation logic for generating images or video frames as discussed herein. The logic can include any appropriate logic components, as may include one or more arithmetic logic units (ALUs), specialized hardware, decoders, field programmable gate arrays (FPGAs), configurable logic blocks (CLBs), and the like. In one embodiment, the logic may be configured using a trained neural network, whereas in other embodiments the logic may generate the new video frame using fixed logic or programmable logic. The processor 1002 can contain other elements as well, as may include memory 1020 for storing data to be processed, one or more registers 1024 for holding data, addresses, or instructions, and one or more multiplexers 1026 for managing data signals, among other such options.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP or FTP. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Python, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A processor comprising: one or more circuits to use one or more neural networks to perform segmentation, wherein the one or more neural networks share one or more network layers to infer a shape of the one or more objects and generate the segmentation, and wherein one or more network parameters including at least weights or bias parameters for the shared network lavers are constrained based, at least in part, on an accuracy of the segmentation and an accuracy of boundary detection.

2. A system comprising: one or more computers comprising one or more processors to use one or more neural networks to perform segmentation of one or more objects within one or more images based, at least in part, on one or more point clouds of the one or more objects, wherein the one or more neural networks share one or more network lavers for inferring a shape of the one or more objects object and generating the segmentation.

3. A non-transitory machine-readable medium having stored thereon a set of instructions, which if performed by one or more processors, cause the one or more processors to at least: train one or more neural networks to perform segmentation of one or more objects within one or more images based, at least in part, on one or more point clouds of the one or more objects, wherein the one or more neural networks share one or more network lavers for inferring a shape of the one or more objects and generating the segmentation.

\* \* \* \* \*